US012643549B2

(12) United States Patent
Liu et al.

(10) Patent No.: US 12,643,549 B2
(45) Date of Patent: Jun. 2, 2026

(54) METHOD, APPARATUS, AND COMPUTER PROGRAM PRODUCT FOR PERCEIVING ROAD STRUCTURE

(71) Applicant: Apollo Intelligent Connectivity (Beijing) Technology Co., Ltd., Beijing (CN)

(72) Inventors: Zongdai Liu, Beijing (CN); Ji Wan, Beijing (CN); Xiaoqing Ye, Beijing (CN); Jun Wang, Beijing (CN); Jingdong Wang, Beijing (CN); Liang Wang, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 228 days.

(21) Appl. No.: 18/235,310

(22) Filed: Aug. 17, 2023

(65) Prior Publication Data

US 2023/0391341 A1 Dec. 7, 2023

(30) Foreign Application Priority Data

Aug. 17, 2022 (CN) .......................... 202210987210.9

(51) Int. Cl.
*B60W 40/06* (2012.01)
*B60W 60/00* (2020.01)
(Continued)

(52) U.S. Cl.
CPC .......... *B60W 40/06* (2013.01); *B60W 60/001* (2020.02); *G06V 10/82* (2022.01); *G06V 20/588* (2022.01)

(58) Field of Classification Search
CPC .... G06V 10/82; G06V 20/56; G06V 10/7715; B60W 2420/403; G01C 21/30
See application file for complete search history.

(56) References Cited

U.S. PATENT DOCUMENTS 11,514,323 B1* 11/2022 Hwang ................. G06N 3/045
2008/0240505 A1 10/2008 Nakamura et al.
(Continued)

FOREIGN PATENT DOCUMENTS

CN 112840350 A 5/2021
CN 113569946 A 10/2021
(Continued)

OTHER PUBLICATIONS

Long et al., "Unifying Obstacle Detection, Recognition, and Fusion Based on the Polarization Color Stereo Camera and LiDAR for the ADAS", Sensor, 2022, 22, 2453 in 20 pages.
(Continued)

*Primary Examiner* — Kenneth J Malkowski
(74) *Attorney, Agent, or Firm* — Knobbe, Martens, Olson & Bear, LLP

(57) ABSTRACT

The present disclosure provides a method, an apparatus, an electronic device, a storage medium and a program product for perceiving a road structure, and relates to the technical field of artificial intelligence and, in particular, to the technical field of deep learning and automatic driving. A specific implementation includes: determining, based on map data, a first perceiving result characterizing a road structure around a current position; determining, by a road structure perceiving model trained in advance, a second perceiving result characterizing the road structure around the current position; and generating a final perceiving result characterizing the road structure around the current position based on the first perceiving result and the second perceiving result.

17 Claims, 7 Drawing Sheets

(51) Int. Cl.
    *G06V 10/82*      (2022.01)
    *G06V 20/56*      (2022.01)

(56)            References Cited

U.S. PATENT DOCUMENTS

| | | | |
|---|---|---|---|
| 2018/0204111 A1 | 7/2018 | Nadeh et al. | |
| 2020/0098135 A1* | 3/2020 | Ganjineh | G06T 7/75 |
| 2021/0049780 A1* | 2/2021 | Westmacot | G01C 21/30 |
| 2021/0201050 A1* | 7/2021 | Marschner | G06F 18/217 |
| 2021/0364320 A1* | 11/2021 | Mennen | G06T 7/50 |
| 2022/0299635 A1* | 9/2022 | Sergeev | A01B 79/005 |

FOREIGN PATENT DOCUMENTS

| | | | |
|---|---|---|---|
| CN | 113997950 A | 2/2022 | |
| CN | 114757301 A | 7/2022 | |

OTHER PUBLICATIONS

Office Action in Chinese Application No. 202210987210.9, dated Apr. 4, 2023 in 9 pages.
Notice of Allowance in Chinese Application No. 202210987210.9, dated Jul. 11, 2023 in 5 pages.

\* cited by examiner

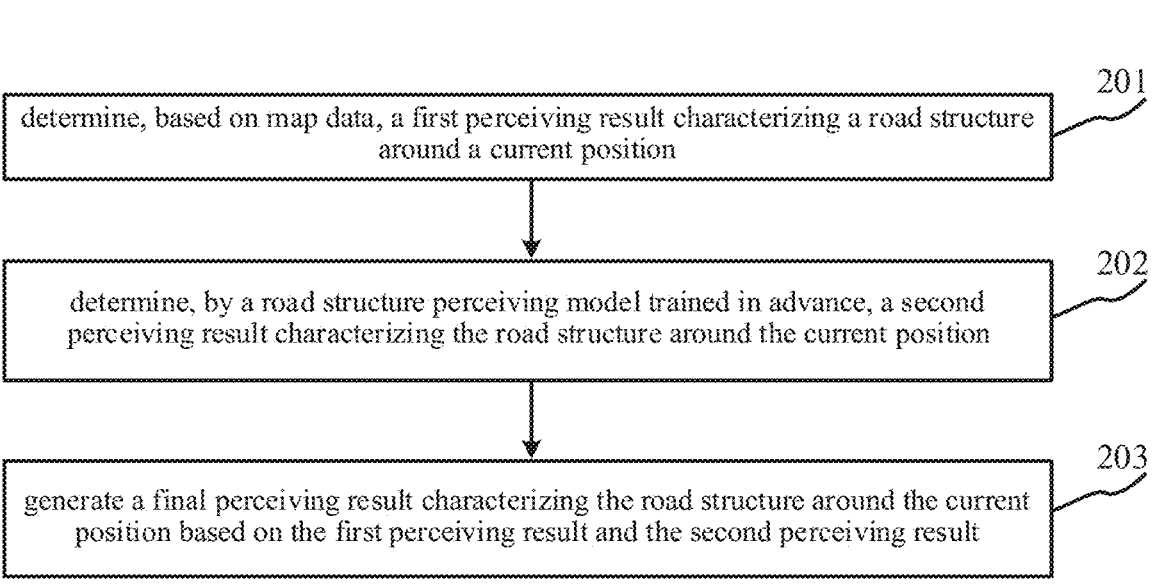

200 determine, based on map data, a first perceiving result characterizing a road structure around a current position
201 determine, by a road structure perceiving model trained in advance, a second perceiving result characterizing the road structure around the current position
202 generate a final perceiving result characterizing the road structure around the current position based on the first perceiving result and the second perceiving result
203

Fig. 2

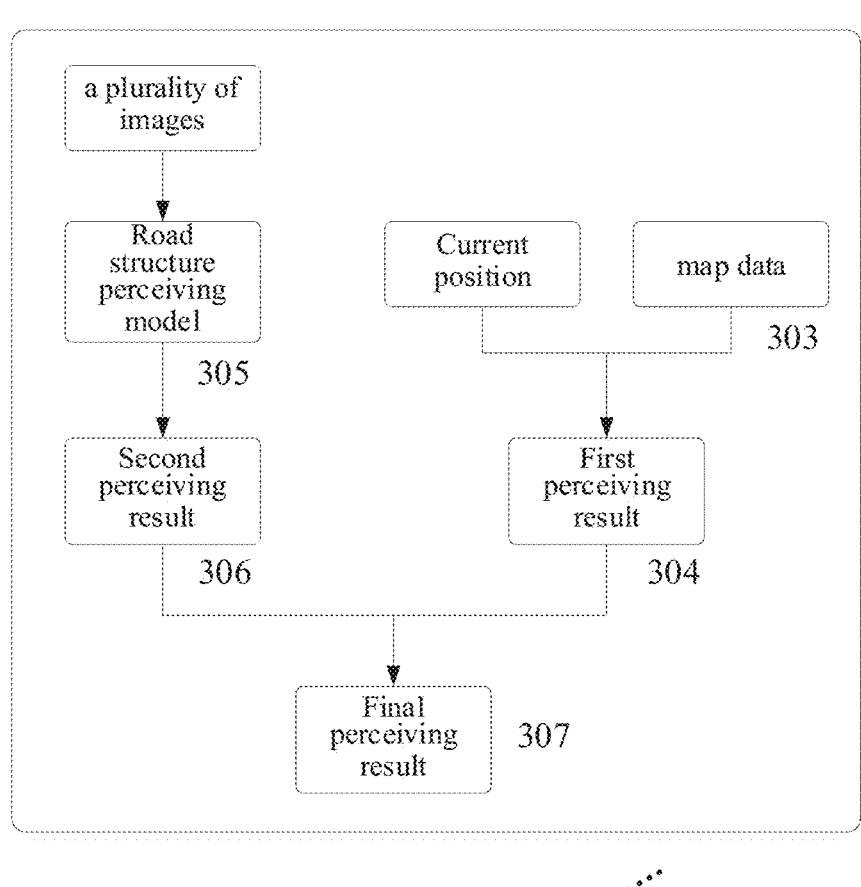
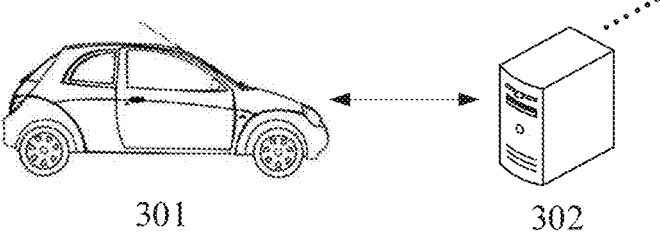
Fig. 3

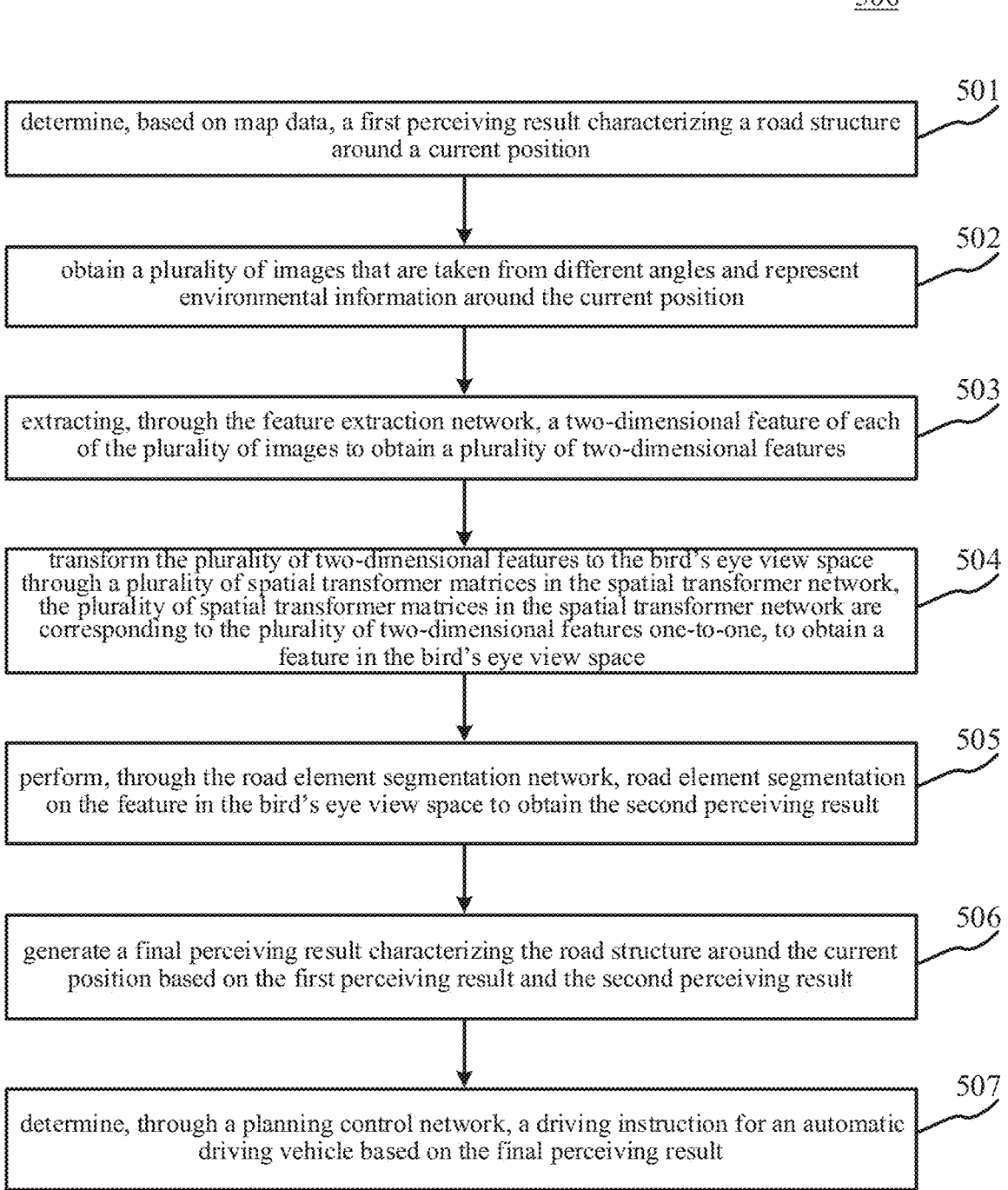

500 determine, based on map data, a first perceiving result characterizing a road structure around a current position

501 obtain a plurality of images that are taken from different angles and represent environmental information around the current position

502 extracting, through the feature extraction network, a two-dimensional feature of each of the plurality of images to obtain a plurality of two-dimensional features

503 transform the plurality of two-dimensional features to the bird's eye view space through a plurality of spatial transformer matrices in the spatial transformer network, the plurality of spatial transformer matrices in the spatial transformer network are corresponding to the plurality of two-dimensional features one-to-one, to obtain a feature in the bird's eye view space

504 perform, through the road element segmentation network, road element segmentation on the feature in the bird's eye view space to obtain the second perceiving result

505 generate a final perceiving result characterizing the road structure around the current position based on the first perceiving result and the second perceiving result

506 determine, through a planning control network, a driving instruction for an automatic driving vehicle based on the final perceiving result

METHOD, APPARATUS, AND COMPUTER PROGRAM PRODUCT FOR PERCEIVING ROAD STRUCTURE

CROSS-REFERENCE TO RELATED APPLICATIONS

The present application claims the priority of Chinese Patent Application No. 202210987210.9, titled "METHOD, APPARATUS, AND COMPUTER PROGRAM PRODUCT FOR PERCEIVING ROAD STRUCTURE", filed on Aug. 17, 2022, the disclosure of which is incorporated herein by reference in its entirety.

TECHNICAL FIELD

The present disclosure relates to the technical field of artificial intelligence, in particular to the technical field of deep learning and automatic driving, and more particularly to a method and an apparatus for perceiving a road structure, a method and an apparatus for training a road structure perceiving model, an electronic device, a storage medium, and a computer program product, which can be used in an automatic driving scene.

BACKGROUND

In an automatic driving system, road structure information is an important input to a decision planning module, and is a basis for executing an action instruction such as a straight driving, a turn, or a lane change and safely and quickly reaching a destination. The road structure information includes three-dimensional topology information of key road elements such as a lane line, a road edge, and a stop line. In the prior art, an accuracy of a perceiving result of the road structure information is low.

SUMMARY

Embodiments of the present disclosure provide to a method and an apparatus for perceiving a road structure, a method and an apparatus for training a road structure perceiving model, an electronic device, and a storage medium.

According to a first aspect, some embodiments of the present disclosure provide a method for perceiving a road structure. The method includes: determining, based on map data, a first perceiving result characterizing a road structure around a current position; determining, by a road structure perceiving model trained in advance, a second perceiving result characterizing the road structure around the current position; and generating a final perceiving result characterizing the road structure around the current position based on the first perceiving result and the second perceiving result.

According to a second aspect, some embodiments of the present disclosure provide a method for training a road structure perceiving model. The method includes: generating a training sample set based on map data, wherein a training sample in the training sample set comprises a plurality of images that are taken from different angles and represent environmental information around a same position, and a road structure element label; and training an initial road structure perceiving model by using a machine learning method, taking the plurality of images in the training sample as an input and taking the road structure element label in the training sample as an expected output, to obtain a trained road structure perceiving model.

According to a third aspect, some embodiments of the present disclosure provide an apparatus for perceiving a road structure. The apparatus includes: a first determining unit, configured to determine, based on map data, a first perceiving result characterizing a road structure around a current position; a second determining unit, configured to determine, by a road structure perceiving model trained in advance, a second perceiving result characterizing the road structure around the current position; and a first generating unit, configured to generate a final perceiving result characterizing the road structure around the current position based on the first perceiving result and the second perceiving result.

According to a fourth aspect, some embodiments of the present disclosure provide an apparatus for training a road structure perceiving model. The apparatus includes: a second generating unit, configured to generate a training sample set based on map data, wherein a training sample in the training sample set comprises a plurality of images that are taken from different angles and represent environmental information around a same position, and a road structure element label; a training unit, configured to train an initial road structure perceiving model by using a machine learning method, taking the plurality of images in the training sample as an input and taking the road structure element label in the training sample as an expected output, to obtain a trained road structure perceiving model.

According to a fifth aspect of the present disclosure, an electronic device is provided, which includes: at least one processor; and a memory communicatively connected to the at least one processor; where, the memory stores instructions executable by the at least one processor, and the instructions, when executed by the at least one processor, cause the at least one processor to perform the method described in any of implementations of the first aspect, or to perform the method described in any of implementations of the second aspect.

According to a sixth aspect of the present disclosure, a non-transitory computer readable storage medium storing computer instructions is provided, where the computer instructions are used to cause the computer to perform the method described in any of implementations of the first aspect, or to perform the method described in any of implementations of the second aspect.

It should be understood that the content described in this section is not intended to identify key or important features of embodiments of the present disclosure, nor is it intended to limit the scope of the present disclosure. Other features of the present disclosure will become readily understood from the following specification.

BRIEF DESCRIPTION OF THE DRAWINGS

The accompanying drawings are used for a better understanding of the scheme, and do not constitute a limitation to the present disclosure. Here:

FIG. 2 is a flowchart of a method for perceiving a road structure according to an embodiment of the present disclosure;

FIG. 3 is a schematic diagram of an application scenario of a method for perceiving a road structure according to an embodiment of the present embodiment;

FIG. 5 is a flowchart of a method for perceiving a road structure according to another embodiment of the present disclosure;

DETAILED DESCRIPTION OF EMBODIMENTS

Example embodiments of the present disclosure are described below with reference to the accompanying drawings, where various details of embodiments of the present disclosure are included to facilitate understanding, and should be considered merely as examples. Therefore, those of ordinary skills in the art should realize that various changes and modifications can be made to the embodiments described herein without departing from the scope of the present disclosure. Similarly, for clearness and conciseness, descriptions of well-known functions and structures are omitted in the following description.

In the technical solution of the present disclosure, the collection, storage, use, processing, transmission, provision, disclosure, etc. of the personal information of a user all comply with the provisions of the relevant laws and regulations, and do not violate public order and good customs.

Figure 1:
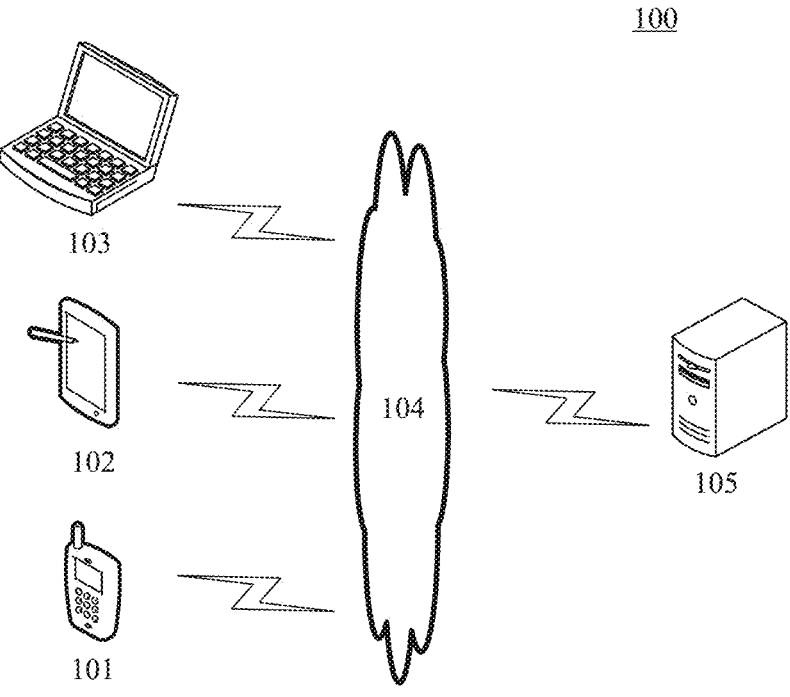
FIG. 1 is an exemplary system architecture diagram to which embodiments of the present disclosure may be applied.

FIG. 1 illustrates an exemplary architecture 100 in which a method and an apparatus for perceiving a road structure, a method and an apparatus for training a road structure perceiving model according to embodiments of the present disclosure may be applied.

As shown in FIG. 1, the system architecture 100 may include terminal device(s) 101, 102, 103, a network 104, and a server 105. The communication connection between the terminal devices 101, 102, 103 constitutes a topology network. The network 104 serves as a medium providing a communication link between the terminal device(s) 101, 102, 103, and the server 105. The network 104 may include various types of connections, such as wired or wireless communication links, or optical cables.

The terminal device(s) 101, 102, 103 may be hardware devices or software that support network connections for data interaction and data processing. When the terminal device(s) 101, 102, 103 is/are hardware, it/they may be various electronic devices supporting functions such as network connection, information acquisition, interaction, display, processing, etc., including but not limited to an image acquisition device, a positioning device, a vehicle-mounted computer, a smartphone, a tablet computer, an electronic book reader, a laptop-type portable computer, a desktop computer, and the like. When the terminal device(s) 101, 102, 103 is/are software, it/they may be installed in the electronic devices listed above. It may be implemented, for example, as a plurality of software or software modules for providing distributed services, or as a single software or software module. It is not specifically limited herein.

The server 105 may be a server providing various services. For example, through images and positions provided by the terminal device(s) 101, 102, 103, the server 105 may be a background processing server that may determine a first perceiving result characterizing a road structure around a current position based on map data; determine, by a road structure perceiving model trained in advance, a second perceiving result characterizing the road structure around the current position; generate a final perceiving result characterizing the road structure around the current position based on the first perceiving result and the second perceiving result. For another example, based on the training sample set provided by the terminal device(s) 101, 102, 103, the server 105 may be a background processing server that performs training by using a machine learning method to obtain a road structure perception model. As an example, server 105 may be a cloud server.

It should be noted that the server may be hardware or software. When the server is hardware, a distributed server cluster composed of multiple servers may be implemented, or a single server may be implemented. When the server 105 is hardware, it may be implemented as a distributed server cluster composed of a plurality of servers, or may be implemented as a single server; when the server 105 is software, it may be implemented as a plurality of software or software modules (e.g., software or software modules used to provide distributed services), or may be implemented as a single software or software module, which is not limited herein.

It should also be noted that the method for perceiving a road structure and the method for training a road structure perceiving model provided in embodiments of the present disclosure may be executed by a server, may be executed by a terminal device, or may be executed by a server and the terminal device in cooperation with each other. Accordingly, each part (for example, each unit) included in the apparatus for perceiving a road structure and the apparatus for training a road structure perceiving model may be entirely provided in the server, may be entirely provided in the terminal equipment, or may be separately provided in the server and the terminal equipment.

It should be understood that the number of the terminal devices, the networks and the servers in FIG. 1 is merely illustrative. There may be any number of the terminal devices, the networks and the servers as desired for implementation.

When the electronic device on which the method for perceiving a road structure and the method for training a road structure perceiving model operates, does not require data transmission with another electronic device, the system architecture may include only the electronic device (such as server or terminal devices) on which the method for perceiving a road structure and the method for training a road structure perceiving model operates.

Referring to FIG. 2, FIG. 2 illustrates a flowchart of a method for perceiving a road structure according to an embodiment of the present disclosure. The flow chart 200 includes the following steps.

Step 201, determining, based on map data, a first perceiving result characterizing a road structure around a current position.

In this embodiment, an execution body (e.g., the terminal device or the server in FIG. 1) of the method for perceiving a road structure may determine a first perceiving result characterizing a road structure around a current position based on map data.

The map data may be an electronic map characterizing all regions (e.g., an entire earth, or an entire country) or partial regions (e.g., a city, or an administrative region). In order to improve an accuracy of the first perceiving result, the map data may be a high-precision map.

As an example, an automatic driving vehicle or an auxiliary driving vehicle may determine the position information thereof in real time during driving, and transmit the position information to the above-mentioned execution body. Further, the execution body may use the position information obtained in real time as a current position of the autonomous vehicle or the auxiliary driving vehicle, obtain three-dimensional topology information of road elements around the current position from the high-precision electronic map in real time, and determine the first perceiving result.

The road structure includes, but is not limited to, structure information such as a lane line, a road edge, a stop line, a traffic light, and the like, and traffic facility/facilities on the road. The first perceiving result characterizes a perceiving result for each road element. In an actual application, surrounding information of the current position is information within a range that takes a current position of the automatic driving vehicle or the auxiliary driving vehicle as a center and takes a preset distance as a radius. The preset distance may be particularly set according to actual conditions. For example, a perceiving range of an information acquisition device is taken as the preset distance, where the information acquisition device is a camera on an automatic driving vehicle or a camera on an auxiliary driving vehicle.

Step 202, determining, by a road structure perceiving model trained in advance, a second perceiving result characterizing the road structure around the current position.

In the present embodiment, the execution body may determine, by a road structure perceiving model trained in advance, a second perceiving result characterizing the road structure around the current position. The road structure perceiving model is used to represent a correspondence relationship between a plurality of images and the second perceiving result, the plurality of images are a plurality of images that are taken from different angles and represent environment information around the current position, and the second perceiving result is a perceiving result that represents a road structure around the current position.

As an example, the automatic driving vehicle or the auxiliary driving vehicle may, by an image acquisition device, obtain a plurality of images that are taken from different angles and represent environmental information around the current position in real time during driving. Then, the obtained plurality of images are input to a road structure perceiving model to generate the second perceiving result that characterizes the road structure such as a lane line, a road edge, a stop line, and a traffic light around the current position.

The road structure perceiving model may be a neural network model capable of determining road elements in an image, and may be, for example, a network such as a convolutional neural network, a circular neural network, or a residual network.

Step 203, generating a final perceiving result characterizing the road structure around the current position based on the first perceiving result and the second perceiving result.

In the present embodiment, the above-described execution body may generate a final perceiving result characterizing the road structure around the current position based on the first perceiving result and the second perceiving result.

As an example, the above-described execution body may generate a final perceiving result characterizing the road structure around the current position in combination with the first perceiving result and the second perceiving result. Particularly, for each type of road element in the first perceiving result and each type of road element in the second perceiving result, the execution body may combine perceiving results of the same road element in the two types of perceiving results according to preset combination weights to obtain perceiving result of the road element in the final perceiving result.

As another example, the above-described execution body may pre-set priorities for the two perceiving results in different scenarios. The execution body may determine current scenario information according to a plurality of images that are taken from different angles and represent the environmental information around the current position, and further use the one of a higher priority in the first perceiving result and the second perceiving result corresponding to the current scenario information as the final perceiving result.

As yet another example, the above-described execution body may fuse the first perceiving result and the second perceiving result to obtain the final perceiving result. Particularly, the road element(s) same in the two perceiving results and road element(s) different in the two perceiving results are determined. The road element(s) different in the two perceiving results falls into two cases. A road element exists in the first perceiving result, but does not exist in the second perceiving result. Or, a road element does not exist in the first perceiving result, but exists in the second perceiving result. The road element(s) different in the two perceiving results in the any of the two cases is used as part of the final perceiving result, together with the road element(s) same in the two perceiving results, to form the final perceiving result.

With continuing reference to FIG. 3, FIG. 3 illustrates a schematic diagram 300 of an application scenario of a method for perceiving a road structure according to an embodiment of the present embodiment. In the application scenario of FIG. 3, during driving of the automatic driving vehicle 301, a current position is determined in real time by a positioning device, and a plurality of images that are taken from different angles and represent environmental information around the current position are obtained in real time by an image acquisition device. The automatic driving vehicle 301 transmits the obtained current position and a plurality of images to the server 302 in real time. The server 302 determines a first perceiving result 304 characterizing a road structure around a current position based on map data 303; determines, by a road structure perceiving model 305 trained in advance, a second perceiving result 306 characterizing the road structure around the current position; generating a final perceiving result 307 characterizing the road structure around the current position based on the first perceiving result 304 and the second perceiving result 306.

In the present embodiment, a method for perceiving a road structure is provided. The method includes determining a first perceiving result characterizing a road structure around a current position based on map data; determining, by a road structure perceiving model trained in advance, a second perceiving result characterizing the road structure around the current position; and generating a final perceiving result characterizing the road structure around the current position based on the first perceiving result and the second perceiving result. In combination with two road structure perceiving modes, the present disclosure improves an accuracy of road structure perceiving results while ensuring an applicable range of road structure perceiving.

Figure 4:
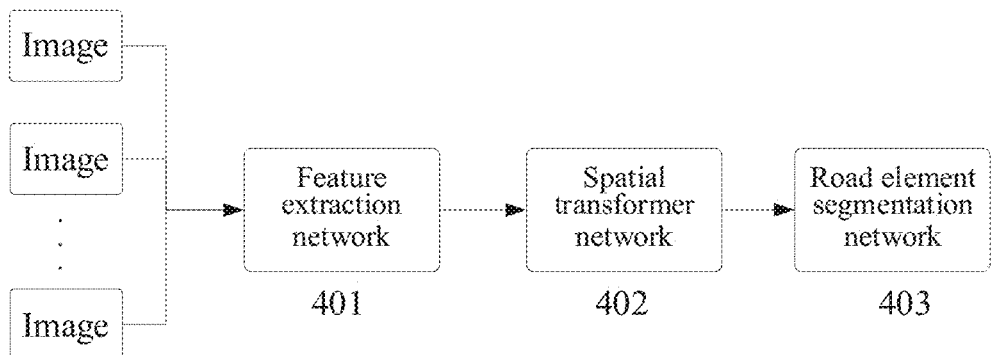
FIG. 4 is a schematic structural diagram of a road structure perceiving model according to an embodiment of the present disclosure.

In some alternative implementations of the present embodiment, as shown in FIG. 4, the road structure perceiving model 400 includes a feature extraction network 401, a spatial transformer network 402, and a road element segmentation network 403. In the present embodiment, the execution body may execute the step 202 as follows.

Firstly, a plurality of images that are taken from different angles and represent environmental information around the current position are obtained.

In the present embodiment, the number of the plurality of images may be specifically set according to actual conditions, and it is intended that the environmental information around the current position of the automatic driving vehicle may be more comprehensively obtained. The automatic driving vehicle pays more attention to the environmental information in front of the vehicle than to the environmental information in rear of the vehicle, and therefore, more of the plurality of images are images characterizing the environmental information in the front.

Secondly, a two-dimensional feature of each of the plurality of images is extracted through the feature extraction network.

In this implementation, the feature extraction network, as the backbone network of the road structure perceiving model, may be a neural network capable of processing images and extracting image features. As an example, the feature extraction network may be a generic backbone neural network such as a residual network.

Thirdly, a plurality of two-dimensional features corresponding to the plurality of images are transformed to a feature in a bird's eye view space through the spatial transformer network.

In the present implementation, a plurality of two-dimensional features corresponding to a plurality of images are mapped to a Bird's Eye View (BEV) space through a spatial transformer network. Further, feature-level fusion of the plurality of images is performed to obtain a feature in the bird's eye view space.

Fourthly, through the road element segmentation network, road element segmentation is performed according to the feature in the bird's eye view space to obtain the second perceiving result.

In the present implementation, the road element segmentation network Seg(·) is composed of several layers of convolutional neural networks, and the road element segmentation prediction may be performed on the feature in the bird's eye view space generated by the spatial transformer network.

$$M=\mathrm{Seg}(F_{bev})$$

Where M satisfies $M \in \mathbb{R}^{B_h \times B_w \times k}$, $B_h$ and $B_w$ are longitudinal perceiving distance and transverse perceiving distance of the automatic driving vehicle, respectively. k represents the number of categories of road elements.

In this implementation, the road structure perceiving model includes three sub-networks: a feature extraction network, a spatial transformer network, and a road element segmentation network. A feature extraction operation, a spatial transformer operation, and a road element segmentation operation are sequentially performed through the three sub-networks to finally obtain a second perceiving result, thereby further improving an accuracy of the second perceiving result.

In some alternative implementations of the present embodiment, the execution body may perform the above third step through the following operations: transforming the plurality of two-dimensional features to the feature in the bird's eye view space through a plurality of spatial transformer matrices in the spatial transformer network, the plurality of spatial transformer matrices are corresponding to the plurality of two-dimensional features one-to-one.

As an example, firstly, a feature tensor $F_{bev}$ in the BEV space is initialized according to the perceiving range of the automatic driving vehicle, where $B_h$ and $B_w$ are longitudinal perceiving distance and transverse perceiving distance of the automatic driving vehicle, respectively. C represents the number of feature dimensions.

Then, n learned spatial transformer matrices $S=\{s_1, s_2, \ldots, s_n\}$ in the spatial transformer network are determined, where $s_i \in \mathbb{R}^{(B_h \times B_w) \times (F_h \times F_w)}$, and $F_h$ and $F_w$ represent height and width of the image, respectively. The spatial transformer matrix may transform a corresponding feature in two-dimensional space to a feature in three-dimensional space. Particularly, the feature(s) in the two-dimensional space may be transformed to the feature(s) in the three-dimensional space by calculating a feature similarity between the two-dimensional space and the three-dimensional space.

Finally, the features in the two-dimensional space are transformed to the features in the three-dimensional space by the following formula:

$$F_{bev} = \sum_i^n s_i \times F_{img}$$

Where, $s_i \times F_{img}$ represents a plurality of two-dimensional features corresponding to the plurality of images.

In the present implementation, the plurality of two-dimensional features corresponding to the plurality of images are transformed from the two-dimensional space to the three-dimensional space through the corresponding spatial transformer matrix/matrices, thereby improving an accuracy of the obtained features in the BEV space.

In some alternative implementations of the present embodiment, the above-described execution body may further perform an operation of: correcting the map data according to the second perceiving result.

The period of updating of the map data, particularly the high-precision map, is relatively long, and there may be a case in which the environmental information has been changed but the high-precision map has not been updated in time. However, the second perceiving result is a result obtained by perceiving the environmental information in real time, so that is more capable of representing the real-time information of the current position. Accordingly, the map data may be corrected according to the second perceiving result to obtain updated map data.

As an example, firstly, the execution body determines the road structure(s) same in the two kinds of perceiving results and road structure(s) different among the two kinds of perceiving results based on the first perceiving result and the second perceiving result. Then, in road structures that are different among the two kinds of perceiving results, for a road element that exists in the first perceiving result, but does not exist in the second perceiving result, when a confidence of the road element in the first perceiving result is high, the road element is fused to a high-precision map to obtain a corrected high-precision map.

In the present implementation, the map data is corrected in time according to the second perceiving result obtained in real time, so that the accuracy of the map data is improved.

In some alternative implementations of the present embodiment, the above-described execution body may further perform an operation of determining a driving instruction for an automatic driving vehicle based on the final perceiving result through a planning control network. The planning control network represents a correspondence between the final perceiving result and the driving instruction.

The planning control network may be obtained by machine learning or intensive learning training. Taking the machine learning as an example, the above-mentioned execution body first obtains a training sample set, where a training sample in the training sample set includes a road structure perceiving result and a driving instruction label. Then, a machine learning method is used to train the initial planning control network by taking the road structure perceiving result in the training sample as an input and taking the driving instruction label in the training sample as an expected output, so as to obtain the trained planning control network.

In the present implementation, an accuracy of the driving instruction is improved based on the final perceiving result.

With continuing reference to FIG. 5, FIG. 5 illustrates a flowchart 500 of a method for perceiving a road structure according to another embodiment of the present disclosure, including the following steps.

Step 501: determining a first perceiving result characterizing a road structure around a current position based on map data.

Step 502: obtaining a plurality of images that are taken from different angles and represent environmental information around the current position.

Step 503: extracting a two-dimensional feature of each of the plurality of images through the feature extraction network, to obtain a plurality of two-dimensional features.

The road structure perceiving model includes a feature extraction network, a spatial transformer network, and a road element segmentation network.

Step 504: transforming the plurality of two-dimensional features to the bird's eye view space through a plurality of spatial transformer matrices in the spatial transformer network, the plurality of spatial transformer matrices in the spatial transformer network are corresponding to the plurality of two-dimensional features one-to-one, to obtain a feature in the bird's eye view space.

Step 505: performing, through the road element segmentation network, road element segmentation on the feature in the bird's eye view space to obtain the second perceiving result.

Step 506: generating a final perceiving result characterizing the road structure around the current position based on the first perceiving result and the second perceiving result.

Step 507: determining, through a planning control network, a driving instruction for an automatic driving vehicle based on the final perceiving result.

As can be seen from the present embodiment, compared with the corresponding embodiment in FIG. 2, the flowchart 500 of the method for perceiving the road structure in the present embodiment specifically describes the process of determining the second perceiving result and the process of determining the driving instruction for the automatic driving vehicle according to the final perceiving result, thereby improving the accuracy of the final perceiving result and improving the accuracy of the driving instruction.

Figure 6:
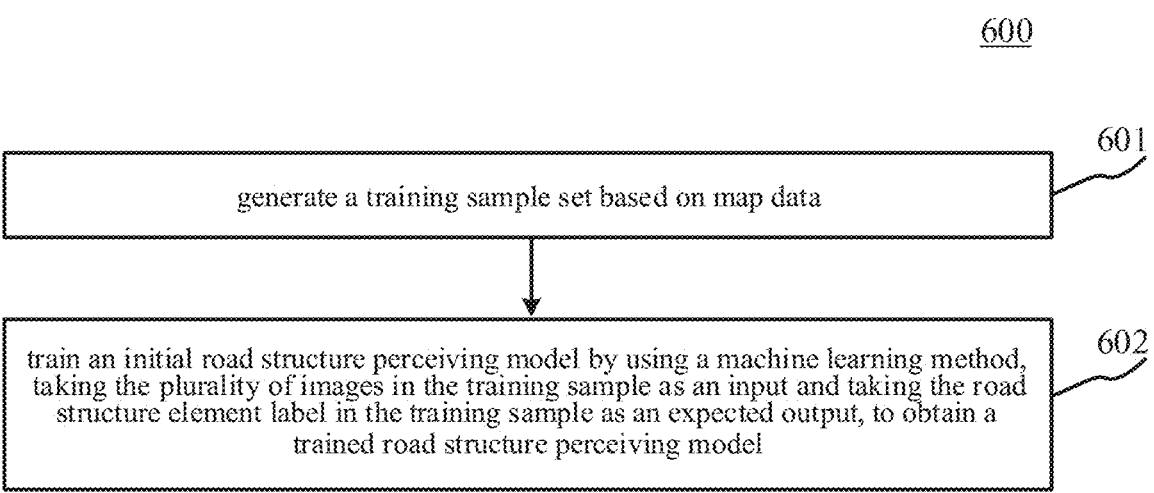
FIG. 6 is a flowchart of a method for training a road structure perceiving model according to an embodiment of the present disclosure.

With continuing reference to FIG. 6, FIG. 6 illustrates a flowchart 600 of a method for training a road structure perceiving model according to an embodiment of the present disclosure, including the following steps.

Step 601: generating a training sample set based on map data.

In the present embodiment, the execution body (for example, the terminal device or the server in FIG. 1) of method for training a road structure perceiving model may generate the training sample set based on the map data. A training sample in the training sample set includes a plurality of images that are taken from different angles and represent environmental information around a same position, and a road structure element label.

The map data may represent an electronic map of all regions (e.g., an entire earth, or an entire country) or an electronic map of partial regions (e.g., a city, or an administrative region). In order to improve an accuracy of the road structure perceiving model, the map data may be a high-precision map.

For example, a high-precision map includes various road element information such as a lane line, a road edge, a stop line, and a traffic light. For a position in the high-precision map, the above-mentioned execution body can project the high-precision map from different angles to obtain a plurality of images, that are taken from different angles and represent the environmental information around the same position, and use the road element information around the position as a road structure element label to obtain a training sample corresponding to the position, and finally obtain a training sample set.

Step 602: training an initial road structure perceiving model by using a machine learning method, taking the plurality of images in the training sample as an input and taking the road structure element label in the training sample as an expected output, to obtain a trained road structure perceiving model.

In the present embodiment, the above-mentioned execution body may train an initial road structure perceiving model by using a machine learning method, taking the plurality of images in the training sample as an input and taking the road structure element label in the training sample as an expected output, to obtain a trained road structure perceiving model.

As an example, the execution body may first select a training sample that hasn't been used for training from the training sample set. Then, a plurality of images in the selected training sample are input into an initial road structure perceiving model to obtain an output. Then, a loss between the output and the road structure element label in the selected training sample is determined. Finally, an update gradient is determined based on the loss, and parameters of the initial road structure perceiving model are updated by a gradient descent method.

The above training operation is performed circularly, and a trained road structure perceiving model is obtained in response to reaching a preset end condition. The preset end condition may be, for example, that the number of training exceeds a preset number threshold, a training duration exceeds a preset duration threshold, and a training loss tends to converge.

In the present embodiment, a method for training a road structure perceiving model is provided, and a training sample set may be automatically generated based on map data to train the road structure perceiving model, thereby improving training efficiency and accuracy of the road structure perceiving model.

In some alternative implementations of the present embodiment, the initial road structure perceiving model includes a feature extraction network, a spatial transformer network, and a road element segmentation network. The above-described execution body may execute the above-described step 602 by training the initial road structure perceiving model by circularly executing following operations using the machine learning method to obtain the trained road structure perceiving model.

Firstly, a training sample is selected from the training sample set.

As an example, the above-described execution body may select a predetermined number of training samples that haven't been used for training from the training sample set as a batch.

Secondly, a two-dimensional feature of each of the plurality of images in a selected training sample is extracted through the feature extraction network.

In this implementation, the feature extraction network, as the backbone network of the road structure perceiving model, may be a neural network capable of processing images and extracting image features. As an example, the feature extraction network may be a generic backbone neural network such as a residual network.

Thirdly, a plurality of two-dimensional features corresponding to the plurality of images are transformed to features in a bird's eye view space through the spatial transformer network.

In the present implementation, a plurality of two-dimensional features corresponding to the plurality of images are mapped to a Bird's Eye View (BEV) space through a spatial transformer network. Further, feature-level fusion of the plurality of images is performed to obtain a feature in the bird's eye view space.

Fourthly, through the road element segmentation network, road element segmentation is performed on the feature in the bird's eye view space, to obtain an actual perceiving result.

In the present implementation, the road element segmentation network Seg(·) is composed of several layers of convolutional neural networks, and the road element segmentation prediction may be performed on the feature in the bird's eye view space generated by the spatial transformer network.

$$M=\mathrm{Seg}(F_{bev})$$

Where M satisfies $M \in \mathbb{R}^{B_h \times B_w \times k}$, $B_h$ and $B_w$ are longitudinal perceiving distance and transverse perceiving distance of the automatic perceiving vechicle, respectively. k represents the number of categories of road elements.

Fifthly, a loss between the actual perceiving result and the road structure element label in the selected training sample is determined.

In the present implementation, the execution body may determine a cross entropy loss between the actual perceiving result and the road structure element label in the selected training sample.

Sixthly, the feature extraction network, the spatial transformer network, and the road element segmentation network is updated according to the loss.

As an example, the above-described execution body may determine an updated gradient based on the loss, and update parameters of the feature extraction network, the spatial transformer network, and the road element segmentation network by using a gradient descent method.

In the present implementation, a detailed network structure and a training process of a road structure perceiving model are provided, and the accuracy of the trained road structure perceiving model is further improved.

In some alternative implementations of the present embodiment, the execution body may perform the above third step through the following operations: transforming the plurality of two-dimensional features to the features in the bird's eye view space through a plurality of spatial transformer matrices in the spatial transformer network, the plurality of spatial transformer matrices are corresponding to the plurality of two-dimensional features one-to-one.

As an example, firstly, a feature tensor $F_{bev}$ in the BEV space is initialized according to the perceiving range of the automatic driving vehicle, where $B_h$ and $B_w$ are longitudinal perceiving distance and transverse perceiving distance of the automatic driving vehicle, respectively. C represents the number of feature dimensions.

Then, n learned spatial transformer matrices $S=\{s_1, s_2, \ldots, s_n\}$ in the spatial transformer network are determined, where $s_i \in \mathbb{R}^{(B_h \times B_w) \times (F_h \times F_w)}$, and $F_h$ and $F_w$ represent height and width of the image, respectively. The spatial transformer matrix may transform a corresponding feature in two-dimensional space to a feature in three-dimensional space. Particularly, the feature(s) in the two-dimensional space may be transformed to a feature(s) in the three-dimensional space by calculating a feature similarity between the two-dimensional space and the three-dimensional space.

Finally, the features in the two-dimensional space are transformed to the features in the three-dimensional space by the following formula:

$$F_{bev} = \sum_i^n s_i \times F_{img}$$

Where, $s_i \times F_{img}$ represents a plurality of two-dimensional features corresponding to the plurality of images.

In the present implementation, the plurality of two-dimensional features corresponding to the plurality of images are transformed from the two-dimensional space to the three-dimensional space by corresponding spatial transformer matrices, thereby improving an accuracy of the obtained feature in the BEV space.

In some alternative implementations of the present embodiment, the above-described execution body may perform the above-described step 601 by the following steps.

Firstly, a set of road structure element labels is generated based on the map data.

The set of road structure element labels may include road structure element labels corresponding to respective positions in the map data. To improve an accuracy of the set of road structure element labels, the map data may be a high-precision map.

Then, a set of image groups is obtained by an image acquisition device.

Each image group in the set of image groups includes a plurality of images that are taken from different angles and represent environmental information around a same position.

In the present implementation, the image acquisition device may operate within a target range to obtain a plurality of images of positions within the target range.

The target range may be matched with a range corresponding to the high-precision map.

Finally, the training sample is generated to obtain the training sample set based on corresponding relationship(s) between position information of road structure element label(s) in the set of road structure element labels and position information of an image group in the set of image group.

Particularly, the above-described execution body may combine a road structure element label for a position and a plurality of images for the same position into a training sample to obtain a training sample set.

In the present implementation, a detailed implementation of generating a training sample set based on map data is provided, so that an accuracy of the obtained training sample is improved.

Figure 7:
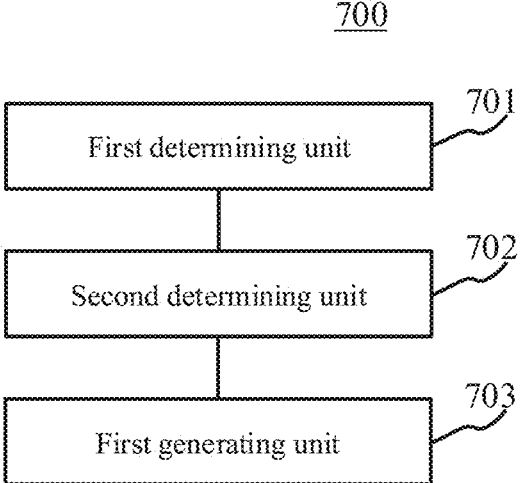
FIG. 7 is a block diagram of an apparatus for perceiving a road structure according to an embodiment of the present disclosure.

With continuing reference to FIG. 7, as an implementation of the method shown in each of the above figures, an embodiment of the present disclosure provides an apparatus for perceiving a road structure, which corresponds to the method embodiment shown in FIG. 2 and which is particularly applicable to various electronic devices.

As shown in FIG. 7, the apparatus 700 for perceiving a road structure includes a first determining unit 701, configured to determine a first perceiving result characterizing a road structure around a current position; a second determining unit 702, configured to determine, by a road structure perceiving model trained in advance, a second perceiving result characterizing the road structure around the current position; and a first generating unit 703, configured to generate a final perceiving result characterizing the road structure around the current position based on the first perceiving result and the second perceiving result.

In some alternative implementations of the present embodiment, a road structure perceiving model comprises a feature extraction network, a spatial transformer network, and a road element segmentation network; and the second determining unit 702 is further configured to: obtain a plurality of images that are taken from different angles and represent environmental information around the current position; extract a two-dimensional feature of each of the plurality of images through the feature extraction network; transform, through the spatial transformer network, a plurality of two-dimensional features corresponding to the plurality of images to a feature in a bird's eye view space; and perform, through the road element segmentation network, road element segmentation on the feature in the bird's eye view space to obtain the second perceiving result.

In some alternative implementations of the present embodiment, the second determining unit 702 is further configured to: transform the plurality of two-dimensional features to the feature in the bird's eye view space through a plurality of spatial transformer matrices in the spatial transformer network, the plurality of special transformer matrices are corresponding to the plurality of two-dimensional features one-to-one.

In some alternative implementations of the present embodiment, the apparatus further includes a correcting unit (not shown) configured to correct the map data according to the second perceiving result.

In some alternative implementations of the present embodiment, the apparatus further includes a third determining unit (not shown) configured to determine, through a planning control network, a driving instruction for an automatic driving vehicle based on the final perceiving result.

The present embodiment provides a method for perceiving a road structure. The apparatus may determine a first perceiving result characterizing a road structure around a current position based on map data; determine, by a road structure perceiving model trained in advance, a second perceiving result characterizing the road structure around the current position; and generate a final perceiving result characterizing the road structure around the current position based on the first perceiving result and the second perceiving result. In combination with two road structure perceiving modes, the present disclosure improves an accuracy of road structure perceiving results while ensuring an applicable range of road structure perceiving.

Figure 8:
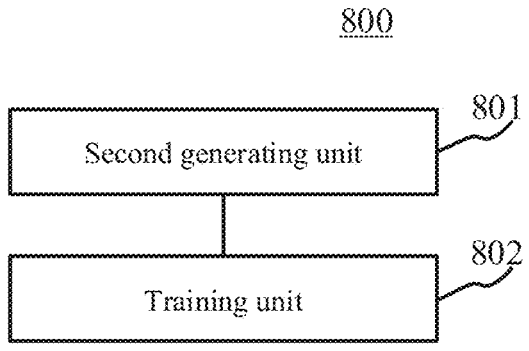
FIG. 8 is a block diagram of an apparatus for training a road structure perceiving model according to an embodiment of the present disclosure.

With continuing reference to FIG. 8, as an implementation of the method shown in each of the above figures, an embodiment of the present disclosure provides an apparatus for training a road structure perceiving model, which corresponds to the method embodiment shown in FIG. 6, and which can be applied to various electronic devices in particular.

As shown in FIG. 8, an apparatus for training a road structure perceiving model includes a second generating unit 801, configured to generate a training sample set based on map data, wherein a training sample in the training sample set comprises a plurality of images that are taken from different angles and represent environmental information around a same position, and a road structure element label; and a training unit 802, configured to train an initial road structure perceiving model by using a machine learning method, taking the plurality of images in the training sample as an input and taking the road structure element label in the training sample as an expected output, to obtain a trained road structure perceiving model.

In some alternative implementations of the present embodiment, the initial road structure perceiving model includes a feature extraction network, a spatial transformer network, and a road element segmentation network; the training unit 802 is further configured to train the initial road structure perceiving model according to following operations by using the machine learning method to obtain the trained road structure perceiving model, and the operations include: selecting the training sample from the training sample set; extracting, through the feature extraction network, a two-dimensional feature of each of the plurality of images in the selected training sample; transforming, through the spatial transformer network, a plurality of two-dimensional features corresponding to the plurality of images to a feature in a bird's eye view space; performing, through the road element segmentation network, road element segmentation on the feature in the bird's eye view space to obtain an actual perceiving result; determining a loss between the actual perceiving result and the road structure element label in the selected training sample; and updating the feature extraction network, the spatial transformer network, and the road element segmentation network according to the loss.

In some alternative implementations of the present embodiment, the training unit 802 is further configured to transform the plurality of two-dimensional features to the feature in the bird's eye view space through a plurality of spatial transformer matrices in the spatial transformer network, the plurality of spatial transformer matrices are corresponding to the plurality of two-dimensional features one-to-one.

In some alternative implementations of the present embodiment, the second generating unit 801 is further configured to generate a set of road structure element labels based on the map data; obtain a set of image groups by an image acquisition device, wherein each image group in the set of image groups comprises a plurality of images that are taken from different angles and represent environmental information around the same position; and generate a training sample based on a corresponding relationship between position information of a road structure element label in the set of road structure element labels and position information of an image group in the set of image groups, to obtain the training sample set.

In the present embodiment, an apparatus for training a road structure perceiving model is provided, and a training sample set may be automatically generated based on map data to train the road structure perceiving model, thereby improving training efficiency and accuracy of the road structure perceiving model.

An embodiment of the present disclosure further provides an electronic device including at least one processor; and a memory communicatively connected to the at least one processor; where, the memory stores instructions executable by the at least one processor, and the instructions, when executed by the at least one processor, cause the at least one processor to perform the method for perceiving a road structure and the method for training a road structure perceiving model described in any of the above embodiments.

An embodiment of the present disclosure provides a readable storage medium storing computer instructions, where the computer instructions are used to cause the computer to perform the method for perceiving a road structure and the method for training a road structure perceiving model described in any of the above embodiments.

An embodiment of the present disclosure provides a computer program product including a computer program, wherein the computer program, when executed by a processor, causes the processor to perform the method for perceiving a road structure and the method for training a road structure perceiving model described in any of the above embodiments.

Figure 9:
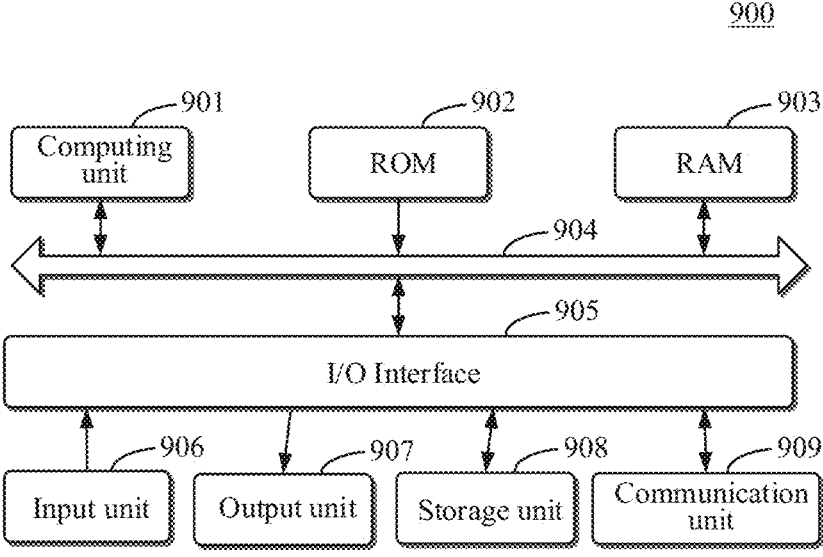
FIG. 9 is a schematic structural diagram of a computer system adapted to implement embodiments of the present disclosure.

FIG. 9 is a schematic block diagram of an example electronic device 900 that may be adapted to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital assistant, a cellular telephone, a smart phone, a wearable device and other similar computing apparatuses. The parts shown herein, their connections and relationships, and their functions are only as examples, and not intended to limit implementations of the present disclosure as described and/ or claimed herein.

As shown in FIG. 9, the device 900 includes a computing unit 901, which can perform various appropriate actions and processes according to a computer program stored in a read only memory (ROM) 902 or a computer program loaded from the storage unit 908 into a random access memory (RAM) 903. In RAM 903, various programs and data required for the operation of device 900 can also be stored. The computing unit 901, ROM 902, and RAM 903 are connected to each other through a bus 904. Input/output (I/O) interface 905 is also connected to bus 904.

A plurality of components in the device 900 are connected to the I/O interface 905, including: an input unit 906, such as a keyboard, a mouse, etc.; an output unit 907, such as various types of displays, speakers, and the like; a storage unit 908, such as a magnetic disk, an optical disk, and the like; and a communication unit 909, such as a network card, a modem, a wireless communication transceiver, and the like. The communication unit 909 allows the device 900 to exchange information/data with other devices through computer networks such as the Internet and/or various telecommunication networks.

The computing unit 901 may be various general-purpose and/or special-purpose processing components with processing and computing capabilities. Some examples of the computing unit 901 include, but are not limited to, a central processing unit (CPU), a graphics processing unit (GPU), various dedicated artificial intelligence (AI) computing chips, various computing units that run machine learning model algorithms, digital signal processors (DSPs), and any appropriate processors, controllers, microcontrollers, and the like. The calculation unit 901 performs the various methods and processes described above, such as a method for perceiving a road structure. For example, in some embodiments, the method for perceiving a road structure may be implemented as a computer software program that is tangibly contained in a machine-readable medium, such as a storage unit 908. In some embodiments, part or all of the computer program may be loaded and/or installed on the device 900 via ROM 902 and/or communication unit 909. When the computer program is loaded into RAM 903 and executed by the computing unit 901, one or more steps of the method for perceiving a road structure described above may be performed. Alternatively, in other embodiments, the computing unit 901 may be configured to perform the method for perceiving a road structure by any other suitable means (e.g., by means of firmware).

Various embodiments of the systems and technologies described above in this paper can be implemented in digital electronic circuit systems, integrated circuit systems, field programmable gate arrays (FPGAs), application specific integrated circuits (ASIC), application specific standard products (ASSP), system on chip (SOC), load programmable logic devices (CPLD), computer hardware, firmware, software, and/or combinations thereof. These various embodiments may include: being implemented in one or more computer programs, the one or more computer programs can be executed and/or interpreted on a programmable system including at least one programmable processor, which can be a special-purpose or general-purpose programmable processor, and can receive data and instructions from the storage system, at least one input device, and at least one output device, and transmitting data and instructions to the storage system, the at least one input device, and the at least one output device.

The program code for implementing the methods of the present disclosure may be written in any combination of one or more programming languages. These program codes can be provided to the processor or controller of general-purpose computer, special-purpose computer or other programmable data processing device, so that when the program code is executed by the processor or controller, the functions/operations specified in the flow chart and/or block diagram are implemented. The program code can be completely executed on the machine, partially executed on the machine, partially executed on the machine and partially executed on the remote machine as a separate software package, or completely executed on the remote machine or server.

In the context of the present disclosure, a machine-readable medium may be a tangible medium that may contain or store a program for use by or in combination with an instruction execution system, apparatus, or device. The machine-readable medium can be a machine-readable signal medium or a machine-readable storage medium. Machine readable media may include, but are not limited to, electronic, magnetic, optical, electromagnetic, infrared, or semiconductor systems, apparatuses, or devices, or any suitable combination of the foregoing. More specific examples of machine-readable storage media may include one or more wire based electrical connections, portable computer disks, hard disks, random access memory (RAM), read only memory (ROM), erasable programmable read only memory (EPROM or flash memory), optical fibers, compact disk read only memory (CD-ROM), optical storage devices, magnetic storage devices, or any suitable combination of the above.

In order to provide interaction with users, the systems and techniques described herein can be implemented on a computer with: a display device for displaying information to users (for example, a CRT (cathode ray tube) or LCD (liquid crystal display) monitor); and a keyboard and a pointing device (e.g., a mouse or a trackball) through which the user can provide input to the computer. Other kinds of devices can also be used to provide interaction with users. For example, the feedback provided to the user may be any form of sensor feedback (e.g., visual feedback, auditory feedback, or tactile feedback); and the input from the user can be received in any form (including acoustic input, voice input, or tactile input).

The systems and techniques described herein may be implemented in a computing system including background components (e.g., as a data server), or a computing system including middleware components (e.g., an application server) or a computing system including a front-end component (e.g., a user computer with a graphical user interface or a web browser through which a user can interact with embodiments of the systems and techniques described herein), or a computing system including any combination of the back-end component, the middleware component, the front-end component. The components of the system can be interconnected by digital data communication (e.g., communication network) in any form or medium. Examples of communication networks include local area networks (LANs), wide area networks (WANs), and the Internet.

A computer system may include a client and a server. The client and the server are generally far away from each other and usually interact through communication networks. The relationship between the client and the server is generated by computer programs running on the corresponding computers and having a client server relationship with each other. The server can be a cloud server, also known as a cloud computing server or cloud host, which is a host product in the cloud computing service system, to solve the problem that the traditional physical host and virtual private server (VPS) has the defects of difficult management and weak service scalability. The server can be a cloud server, a distributed system server, or a blockchain server.

Embodiments of the present disclosure provide a method for perceiving a road structure, including: determining a first perceiving result characterizing a road structure around a current position based on map data; determining, by a road structure perceiving model trained in advance, a second perceiving result characterizing the road structure around the current position; generating a final perceiving result characterizing the road structure around the current position based on the first perceiving result and the second perceiving result. In combination with two road structure perceiving modes, the present disclosure improves an accuracy of road structure perceiving results while ensuring an applicable range of road structure perceiving.

It should be understood that various forms of processes shown above can be used to reorder, add or delete steps. For example, the steps recorded in embodiments of the present disclosure can be performed in parallel, in sequence, or in different orders, as long as the desired results of the technical solution of the present disclosure can be achieved, which is not limited herein.

The above specific embodiments do not constitute restrictions on the scope of the present disclosure. Those skilled in the art should understand that various modifications, combinations, sub combinations and substitutions can be made according to design requirements and other factors. Any modification, equivalent replacement and improvement made within the principles of this disclosure shall be included in the scope of protection of this disclosure.

What is claimed is:

1. A method for perceiving a road structure, comprising:
determining, based on map data, a first perceiving result characterizing a road structure around a current position of an automatic driving vehicle or an auxiliary driving vehicle;
determining, by a road structure perceiving model trained in advance, a second perceiving result characterizing the road structure around the current position;
generating a final perceiving result characterizing the road structure around the current position based on the first perceiving result and the second perceiving result;
wherein the road structure perceiving model comprises a feature extraction network, a spatial transformer network, and a road element segmentation network; and
the determining, by the road structure perceiving model trained in advance, the second perceiving result characterizing the road structure around the current position of an automatic driving vehicle or an auxiliary driving vehicle, comprises:
obtaining a plurality of images by an image acquisition device, wherein the plurality of images are taken from different angles and representing environmental information around the current position;
extracting, through the feature extraction network, a two-dimensional feature of each of the plurality of images;
transforming, through the spatial transformer network, a plurality of two-dimensional features corresponding to the plurality of images into three-dimensional features of the plurality of images in a bird's eye view space;
fusing the three-dimensional features of the plurality of images in the bird's eye view space to obtain a fusion feature in the bird's eye view space; and
performing, through the road element segmentation network, road element segmentation on the fusion feature in the bird's eye view space, to obtain the second perceiving result.

2. The method according to claim 1, wherein the transforming, through the spatial transformer network, the plurality of two-dimensional features corresponding to the plurality of images into the three-dimensional features in the bird's eye view space, comprises:
transforming the plurality of two-dimensional features into the three-dimensional features in the bird's eye view space through a plurality of spatial transformer matrices in the spatial transformer network, the plurality of spatial transformer matrices corresponding to the plurality of two-dimensional features one-to-one.

3. The method according to claim 1, further comprising:
correcting the map data according to the second perceiving result.

4. The method according to claim 1, further comprising:
determining, through a planning control network, a driving instruction for the automatic driving vehicle or the auxiliary driving vehicle based on the final perceiving result; and using the driving instruction to drive the automatic driving vehicle or the auxiliary driving vehicle.

5. The method according to claim 1, wherein the road structure perceiving model is trained by:

generating a training sample set based on map data, wherein each of training samples in the training sample set comprises a plurality of sample images that are taken from different angles and represent environmental information around a same sample position, and a road structure element label; and training an initial road structure perceiving model by using a machine learning method, taking the plurality of sample images in each training sample of the training sample set as an input, and taking the road structure element label in each training sample of the training sample set as an expected output to obtain the pre-trained road structure perceiving model.

6. The method according to claim 5, wherein the initial road structure perceiving model comprises the feature extraction network, the spatial transformer network, and the road element segmentation network; and the training the initial road structure perceiving model by using the machine learning method, taking the plurality of sample images in each training sample of the training sample set as the input, and taking the road structure element label in each training sample of the training sample set as the expected output to obtain the trained road structure perceiving model comprises:

selecting a target training sample from the training sample set;

extracting, through the feature extraction network, a two-dimensional feature of each of the plurality of sample images in the selected target training sample;

transforming, through the spatial transformer network, a plurality of two-dimensional features corresponding to the plurality of sample images into a sample feature in a bird's eye view space;

performing, through the road element segmentation network, road element segmentation on the sample feature in the bird's eye view space to obtain an actual perceiving result;

determining a loss between the actual perceiving result and the road structure element label in the selected target training sample; and updating the feature extraction network, the spatial transformer network, and the road element segmentation network according to the loss.

7. The method according to claim 6, wherein the transforming, through the spatial transformer network, the plurality of two-dimensional features corresponding to the plurality of sample images into the feature in the bird's eye view space, comprises:

transforming the plurality of two-dimensional features corresponding to the plurality of sample images into the sample feature in the bird's eye view space through a plurality of spatial transformer matrices in the spatial transformer network, the plurality of spatial transformer matrices corresponding to the plurality of two-dimensional features one-to-one.

8. The method according to claim 5, wherein the generating the training sample set based on the map data, comprises:

generating a set of road structure element labels including the road structure element label of each training sample based on the map data;

obtaining a set of sample image groups by the image acquisition device, wherein each sample image group in the set of sample image groups comprises the plurality of sample images that are taken from different angles and represent environmental information around the same sample position and are included in each training sample; and generating the training samples based on a corresponding relationship between position information of the road structure element labels in the set of road structure element labels and position information of the sample image groups in the set of sample image groups, to obtain the training sample set.

9. An apparatus for perceiving a road structure, comprising:

at least one processor; and a memory storing instructions which, when executed by the at least one processor, cause the at least one processor to perform operations, the operations comprising:

determining, based on map data, a first perceiving result characterizing a road structure around a current position of an automatic driving vehicle or an auxiliary driving vehicle;

determining, by a road structure perceiving model trained in advance, a second perceiving result characterizing the road structure around the current position;

generating a final perceiving result characterizing the road structure around the current position based on the first perceiving result and the second perceiving result;

wherein the road structure perceiving model comprises a feature extraction network, a spatial transformer network, and a road element segmentation network; and the determining, by the road structure perceiving model trained in advance, the second perceiving result characterizing the road structure around the current position of an automatic driving vehicle or an auxiliary driving vehicle, comprises:

obtaining a plurality of images by an image acquisition device, wherein the plurality of images are taken from different angles and representing environmental information around the current position;

extracting, through the feature extraction network, a two-dimensional feature of each of the plurality of images;

transforming, through the spatial transformer network, a plurality of two-dimensional features corresponding to the plurality of images into three-dimensional features of the plurality of images in a bird's eye view space;

fusing the three-dimensional features of the plurality of images in the bird's eye view space to obtain a fusion feature in the bird's eye view space; and performing, through the road element segmentation network, road element segmentation on the fusion feature in the bird's eye view space, to obtain the second perceiving result.

10. The apparatus according to claim 9, wherein the transforming, through the spatial transformer network, the plurality of two-dimensional features corresponding to the plurality of images into the three-dimensional features in the bird's eye view space, comprises:

transforming the plurality of two-dimensional features into the three-dimensional features in the bird's eye view space through a plurality of spatial transformer matrices in the spatial transformer network, the plurality of spatial transformer matrices corresponding to the plurality of two-dimensional features one-to-one.

11. The apparatus according to claim 9, the operations further comprising:

correcting the map data according to the second perceiving result.

12. The apparatus according to claim 9, the operations further comprising:

determining, through a planning control network, a driving instruction for the automatic driving vehicle or the auxiliary driving vehicle based on the final perceiving result; and using the driving instruction to drive the automatic driving vehicle or the auxiliary driving vehicle.

13. The apparatus according to claim 9, wherein the road structure perceiving model is trained by:

generating a training sample set based on map data, wherein each of training samples in the training sample set comprises a plurality of sample images that are taken from different angles and represent environmental information around a same sample position, and a road structure element label; and training an initial road structure perceiving model by using a machine learning method, taking the plurality of sample images in each training sample of the training sample set as an input, and taking the road structure element label in each training sample of the training sample set as an expected output to obtain the trained road structure perceiving model.

14. The apparatus according to claim 13, wherein the initial road structure perceiving model comprises the feature extraction network, the spatial transformer network, and the road element segmentation network;

the training the initial road structure perceiving model by using the machine learning method, taking the plurality of sample images in each training sample of the training sample set as the input, and taking the road structure element label in each training sample of the training sample set as the expected output, to obtain the trained road structure perceiving model, comprises:

selecting a target training sample from the training sample set;

extracting, through the feature extraction network, a two-dimensional feature of each of the plurality of sample images in the selected target training sample;

transforming, through the spatial transformer network, a plurality of two-dimensional features corresponding to the plurality of sample images to a sample feature in a bird's eye view space;

performing, through the road element segmentation network, road element segmentation on the sample feature in the bird's eye view space to obtain an actual perceiving result;

determining a loss between the actual perceiving result and the road structure element label in the selected target training sample; and updating the feature extraction network, the spatial transformer network, and the road element segmentation network according to the loss.

15. The apparatus according to claim 14, wherein the transforming, through the spatial transformer network, the plurality of two-dimensional features corresponding to the plurality of sample images into the feature in the bird's eye view space, comprises:

transforming the plurality of two-dimensional features corresponding to the plurality of sample images into the sample feature in the bird's eye view space through a plurality of spatial transformer matrices in the spatial transformer network, the plurality of spatial transformer matrices corresponding to the plurality of two-dimensional features one-to-one.

16. The apparatus according to claim 13, wherein the generating the training sample set based on the map data, comprises:

generating a set of road structure element labels including the road structure element label of each training sample based on the map data;

obtaining a set of sample image groups by the image acquisition device, wherein each sample image group in the set of sample image groups comprises the plurality of sample images that are taken from different angles and represent environmental information around the same sample position and are included in each training sample; and generating the training samples based on a corresponding relationship between position information of the road structure element labels in the set of road structure element labels and position information of the sample image groups in the set of sample image groups, to obtain the training sample set.

17. A non-transitory computer-readable storage medium, the non-transitory computer-readable storage medium storing computer instructions thereon, wherein the computer instructions are used to cause the computer to perform a method for perceiving a road structure, comprising:

determining, based on map data, a first perceiving result characterizing a road structure around a current position of an automatic driving vehicle or an auxiliary driving vehicle;

determining, by a road structure perceiving model trained in advance, a second perceiving result characterizing the road structure around the current position;

generating a final perceiving result characterizing the road structure around the current position based on the first perceiving result and the second perceiving result, wherein the road structure perceiving model comprises a feature extraction network, a spatial transformer network, and a road element segmentation network; and the determining, by the road structure perceiving model trained in advance, the second perceiving result characterizing the road structure around the current position of an automatic driving vehicle or an auxiliary driving vehicle, comprises:

obtaining a plurality of images by an image acquisition device, wherein the plurality of images are taken from different angles and representing environmental information around the current position;

extracting, through the feature extraction network, a two-dimensional feature of each of the plurality of images;

transforming, through the spatial transformer network, a plurality of two-dimensional features corresponding to the plurality of images into three-dimensional features of the plurality of images in a bird's eye view space;

fusing the three-dimensional features of the plurality of images in the bird's eye view space to obtain a fusion feature in the bird's eye view space; and performing, through the road element segmentation network, road element segmentation on the fusion feature in the bird's eye view space, to obtain the second perceiving result.

* * * * *